United States Patent
Deng

(10) Patent No.: US 12,287,999 B2
(45) Date of Patent: *Apr. 29, 2025

(54) IMAGE DISPLAY METHOD AND APPARATUS, ELECTRONIC DEVICE, AND RELATED READABLE STORAGE MEDIUM

(71) Applicant: VIVO MOBILE COMMUNICATION CO., LTD., Dongguan (CN)

(72) Inventor: Zhao Deng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,092

(22) Filed: Apr. 23, 2024

(65) Prior Publication Data

US 2024/0272856 A1 Aug. 15, 2024

Related U.S. Application Data

(63) Continuation of application No. 18/078,069, filed on Dec. 8, 2022, now Pat. No. 11,995,368, which is a (Continued)

(30) Foreign Application Priority Data

Jun. 9, 2020 (CN) .......................... 202010518228.5

(51) Int. Cl.
*G09G 5/14* (2006.01)
*G06F 3/14* (2006.01)
(Continued)

(52) U.S. Cl.
CPC ................. *G06F 3/14* (2013.01); *G09G 5/14* (2013.01); *G06F 16/532* (2019.01); *G06F 16/54* (2019.01);
(Continued)

(58) Field of Classification Search
CPC .......... G06F 3/14; G06F 16/532; G06F 16/54; G09G 5/14; G09G 2320/0626; G09G 2320/0686
See application file for complete search history.

(56) References Cited

U.S. PATENT DOCUMENTS 11,995,368 B2 * 5/2024 Deng ........................ G06F 3/14
2009/0070820 A1 3/2009 Li
(Continued)

FOREIGN PATENT DOCUMENTS

| CN | 105138237 A | 12/2015 |
| CN | 108646960 A | 10/2018 |

(Continued)

OTHER PUBLICATIONS

International Search Report issued in corresponding International Application No. PCT/CN2021/098294, mailed Sep. 1, 2021, 4 pages.
(Continued)

*Primary Examiner* — Adam J Snyder
(74) *Attorney, Agent, or Firm* — IPX PLLC

(57) ABSTRACT

An image display method, an electronic device, and a storage medium are disclosed. The image display method includes: creating a first label associated with a first image in a target gallery, where the first label corresponds to a first manner of displaying an image; and in response to an input to access the target gallery, displaying a first display interface that displays the first image in the first manner and a second image from the target gallery in a second manner, where the first image is different from the second image and the first manner is different from the second manner.

20 Claims, 6 Drawing Sheets

Related U.S. Application Data continuation of application No. PCT/CN2021/098294, filed on Jun. 4, 2021.

(51) Int. Cl.
  *G06F 16/532* (2019.01)
  *G06F 16/54* (2019.01)
  *G06F 16/58* (2019.01)

(52) U.S. Cl.
  CPC . *G06F 16/5866* (2019.01); *G09G 2320/0626* (2013.01); *G09G 2320/0686* (2013.01)

(56) References Cited

U.S. PATENT DOCUMENTS

| | | |
|---|---|---|
| 2015/0149927 A1 | 5/2015 | Walkin et al. |
| 2019/0384789 A1 | 12/2019 | Lee et al. |

FOREIGN PATENT DOCUMENTS

| | | | |
|---|---|---|---|
| CN | 108984677 A | 12/2018 | |
| CN | 109739406 A | 5/2019 | |
| CN | 110287352 A | 9/2019 | |
| CN | 111694975 A | 9/2020 | |

OTHER PUBLICATIONS

First Office Action issued in related Chinese Application No. 202010518228.5, mailed Feb. 22, 2023, 7 pages.

\* cited by examiner

IMAGE DISPLAY METHOD AND APPARATUS, ELECTRONIC DEVICE, AND RELATED READABLE STORAGE MEDIUM

CROSS-REFERENCE TO RELATED APPLICATIONS

This application is a continuation of U.S. application Ser. No. 18/078,069, filed on Dec. 8, 2022, now U.S. Pat. No. 11,995,368, which is a continuation of International Application No. PCT/CN2021/098294, filed Jun. 4, 2021, which claims priority to Chinese Patent Application No. 202010518228.5, filed Jun. 9, 2020. The entire contents of each of the above-referenced applications are expressly incorporated herein by reference.

TECHNICAL FIELD

The present disclosure relates to the field of image processing technologies, and in particular, to an image display method and apparatus, an electronic device, and a storage medium.

BACKGROUND

Many photos may be stored in an album on an electronic device, and different photos in the same photographing scenario are usually stored in the album, so that these photos look relatively similar.

In the related art, when a chat application is used to transmit photos in an album, only a few photos can be selected each time. In this case, when many photos in the album are to be transmitted, the remaining photos need to be selected from the album after a part of the photos are transmitted. However, because photos look similar or there are too many photos, the user selects the same photo repeatedly, or misses a photo.

It is known that the recognition of photos is poor in the related art.

SUMMARY

Embodiments of the present disclosure provide an image display method and apparatus, an electronic device, and a storage medium.

According to a first aspect, an embodiment of the present disclosure provides an image display method, including:
  receiving a second input from a user in a case that a first input for a first image is received; and
  displaying a first display interface in response to the second input, where the first display interface includes the first image displayed in a first manner and a second image displayed in a second manner, and the first image and the second image are different images in a target gallery.

According to a second aspect, an embodiment of the present disclosure further provides an image display apparatus, including:
  a receiving module, configured to receive a second input from a user in a case that a first input for a first image is received; and
  a first display module, configured to display a first display interface in response to the second input, where the first display interface includes the first image displayed in a first manner and a second image displayed in a second manner, and the first image and the second image are different images in a target gallery.

According to a third aspect, the embodiments of the present disclosure provide an electronic device, including: a memory, a processor, and a program or an instruction that is stored in the memory and that can be run on the processor. When the program or the instruction is executed by the processor, the steps of the image display method provided in the first aspect in the embodiments of the present disclosure are implemented.

According to a fourth aspect, the embodiments of the present disclosure further provide a readable storage medium. The readable storage medium stores a program or an instruction, and when the program or the instruction is executed by a processor, the steps of the image display method provided in the first aspect in the embodiments of the present disclosure are implemented.

The image display method provided in the embodiments of the present disclosure includes: receiving a second input from a user in a case that a first input for a first image is received; and displaying a first display interface in response to the second input, where the first display interface includes the first image displayed in a first manner and a second image displayed in a second manner, and the first image and the second image are different images in a target gallery. In this way, when the user invokes the target gallery through the second input, the first image and the second image can be displayed in different manners, to avoid confusion between the first image and the second image, thereby improving recognition of images in the target gallery.

BRIEF DESCRIPTION OF DRAWINGS

To describe technical solutions in embodiments of the present disclosure more clearly, the following briefly describes accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
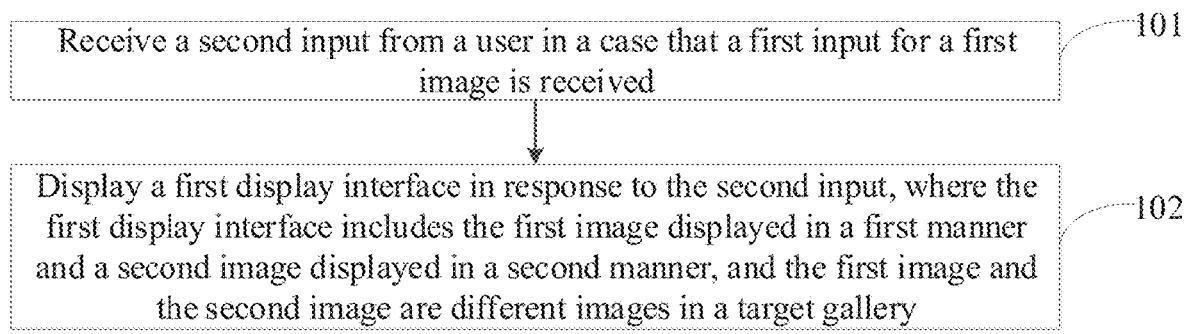
FIG. 1 is a flowchart of an image display method according to an embodiment of the present disclosure.

Referring to FIG. 1, FIG. 1 shows an image display method according to an embodiment of the present disclosure. As shown in FIG. 1, the method may include the following steps.

Step 101: Receive a second input from a user in a case that a first input for a first image is received.

Step 102: Display a first display interface in response to the second input, where the first display interface includes the first image displayed in a first manner and a second image displayed in a second manner, and the first image and the second image are different images in a target gallery.

The first input may be at least one of an editing input or an invoking input for the first image. For example, when a transmission input, an editing input, or a sharing input is performed on the first image by using a third-party application, it is determined that the first input for the first image is received. In addition, the second input may be an operation of opening the target gallery, or selecting, through an application, an image from the target gallery for transmission, sharing, or editing. In an exemplary implementation, an interface of the target gallery or an image selection interface in an application image can be displayed in response to the second input, where the image selection interface may include an image in the target gallery.

In addition, the first manner and the second manner may be different display manners, and images in different display manners have different display parameters, display locations, and the like, so that the user can visually distinguish the first image from the second image.

In an exemplary implementation, in a case that the first input for the first image is received, a label associated with the first image can be generated in the background, and different labels may correspond to different display manners. For example, in a case that the first input is to transmit the first image, the generated label is a transmission label, and a display manner corresponding to the transmission label is: displaying the first image according to a preset display parameter, where the first display interface displayed in step 102 includes the first image displayed according to the preset display parameter, and the preset display parameter may include display dimension, brightness, and background color. In an exemplary implementation, the foregoing different display manners may further include displaying in different display areas and the like, which is not exhaustive herein.

In addition, in an exemplary implementation, the label may include a type of the first input. For example, when the first input is editing the first image, a label corresponding to the first input is an editing label, and the editing label may be associated with an edited first image. In addition, when the first input is a transmission input or a sharing input performed on the first image through a third-party application, a label corresponding to the first input may be an invoking label, and the invoking label may include identifier information of the third-party application, for example, an application package name.

In actual application, the same image may be associated with a plurality of labels. For example, in a case that an edited image is transmitted, the image may be associated with an editing label and an invoking label.

In addition, in an exemplary implementation, in addition to the first image on which the first input is performed, another image in the target gallery may be normally displayed, that is, displayed in a system default display manner.

In an exemplary implementation, a correspondence between a label type and a display manner may be stored. For example, an image corresponding to the editing label is displayed in a first picture library, and an unedited image is displayed in the second gallery. In addition, the transparency of an image corresponding to the invoking label is greater than the transparency of another image. In this way, after a label is obtained, an image associated with the label may be displayed in a display manner corresponding to the label, so that the user distinguishes the first image operated through the first input from another image.

In an exemplary implementation, that in a case that the first input for the first image is received, a first label associated with the first image is generated in response to the first input, and a first manner corresponding to the first label is determined includes:
  obtaining resource positioning information of the first image in response to the first input, where the first image is in a one-to-one correspondence with the resource positioning information of the first image; and
  generating a first label associated with the resource positioning information, determining a first manner corresponding to the first label; and
  the displaying a first display interface in response to the second input includes: determining the first label according to the resource positioning information in response to the second input, displaying the first image in the first manner corresponding to the first label, and displaying the second image in the second manner, where the first manner is different from the second manner.

In an exemplary implementation, the resource positioning information of the first image may be a Uniform Resource Locator (URL) of the first image, and the URL is in a one-to-one correspondence with the first image, so that the first image corresponding to the URL can be uniquely determined according to the URL.

In addition, in actual application, the resource positioning information, label information, and a display manner corresponding to the label information may be associated and stored in a database. In addition, the displaying the first image in the first manner may be understood as: searching the database for all labels, obtaining resource positioning information and display manners associated with all the labels, and then determining a resource location of the first image according to the obtained resource positioning information, to control the first image at the resource location to be displayed in the first manner.

In this implementation, the resource positioning information of the first image is associated with the label of the first image, so that the label can be searched for. In addition, the first image associated with the resource positioning information and the label is displayed in the first manner, so that the electronic device determines the first image, thereby improving the reliability of the image display method.

In an exemplary implementation, the first input includes at least one of the following:
  an invoking input for the first image by using a target application; or
  an editing input for the first image, where
  in a case that the first input includes the editing input for the first image, the method further includes:
  generating an edited first image in response to the editing input, where
  the first display interface includes the edited first image displayed in the first manner.

In the related art, after any editing input such as beautifying or clipping an image, an edited image is generated, and the edited image is displayed side by side with the pre-edited image. In this way, it is difficult for the user to distinguish between a pre-edited photo and an edited photo. In this implementation, the pre-edited image and the edited image are displayed in different manners, so that the user can easily distinguish between the pre-edited image and the edited image, thereby improving image recognition.

In addition, the display manner of the edited first image may include: displaying the edited first image in a first sub-gallery or a first sub-area on a gallery display interface, and displaying the pre-edited image or the edited image in a second sub-gallery or a second sub-area on the gallery display interface, where the first sub-gallery is different from the second sub-gallery, or the first sub-area is different from the second sub-area.

In an exemplary implementation, in a case that the first input is an invoking input for the first image through the target application, the label associated with the first image may include identifier information of the target application, for example, including an application package name of the target application, or may further include specific operation information of the invoking input. In this way, when the second input matching the invoking input for an image in the target gallery is subsequently received, the first image is displayed in the first manner, and the second image is displayed in the second manner. For example, the invoking input is: sending information to a friend A. When sending an image in the target gallery to friend A again, the transparency of the image sent to the friend A increases, so that the user conveniently distinguishes between a sent image and an unsent image.

In this implementation, in a case that the first input is the invoking input for the first image through the target application, the label associated with the first image carries the identifier information of the target application, so that in a case the same invoking input is performed on the target gallery through the target application again, the display manner of the first image on which the first input is performed is different from a display manner of another image, thereby improving recognition of an operated image.

In an exemplary implementation, at least one of the following features in first manner and second manner is different, including background color, transparency, display brightness, or a display area.

It should be noted that, in an exemplary implementation, in addition to different background colors, transparencies, or display brightness, a difference between the first manner and the second manner may be further represented as different image sizes or different image borders. This is not specifically limited herein.

In addition, that the edited first image and the first image are displayed in different display areas may be understood as: the edited first image and the first image are displayed in different sub-galleries. For example, if the first image is obtained by a camera through photography, the first image may be displayed in a camera sub-gallery, and the edited first image may be displayed in an editing sub-gallery.

In some embodiments, that the edited first image and the first image are displayed in different display areas may be understood as: the edited first image and the first image are displayed in different areas on the same display interface, for example, the edited image is displayed on the left side, and a pre-edited image and an unedited image are displayed on the right side.

In this implementation, an edited image and a pre-edited image are separately displayed, to avoid confusion, thereby improving recognition of the edited image.

In another implementation, the edited first image may be further displayed next to the first image, and a display parameter of the edited first image, such as brightness or a background color, is changed, and the display parameter is different from a display parameter corresponding to an invoking label. For example, the brightness of the edited first image increases, and the transparency of the first image corresponding to the invoking label increases.

In an exemplary implementation, the receiving of the second input from a user in a case that the first input for a first image is received includes:
  receiving the second input from the user in a case that the first input for the first image and a third input for a third image are received, where
  the first display interface includes the first image displayed in the first manner, the second image displayed in the second manner, and the third image displayed in a third manner, and the first image, the second image, and the third image are different images in the target gallery.

In an exemplary implementation, the first input and the third input may be different types of inputs for an image. For example, if the first input is an editing input operation for the first image, and the third input is a transmission input operation for the third image, the first image and the third image are displayed on a first interface in display manners associated with corresponding input types, and have a different display manner from another second image.

In addition, the first image, the second image, and the third image are not limited to one image, and the first input and the third input are not limited to one operation step. For example, if the first input is an editing operation for an image, the first image may include all edited images in the target gallery.

In this implementation, images of different input manners are displayed in different display manners, thereby further improving recognition of the images of the different input manners.

In an exemplary implementation, the receiving a second input from a user in a case that a first input for a first image is received includes:
  receiving the second input from the user at a second moment in a case that the first input for the first image is received at a first moment;
  the displaying a first display interface in response to the second input includes:
  if a time interval between the first moment and the second moment is less than or equal to a first threshold, displaying the first image in the first manner and displaying the second image in the second manner on the first display interface in response to the second input; and
  the method further includes:
  if the time interval between the first moment and the second moment is greater than the first threshold, displaying the first image and the second image in the second display manner on the first display interface in response to the second input.

In an exemplary implementation, the first threshold may be a relatively short time length, for example, 3 minutes, 5 minutes, or half an hour. In this way, the first image may be displayed only in a different display manner in a short time after the first input, thereby avoiding a problem that the first image is displayed in the first manner for a long time and the image is the same as or confused with a display manner of an image in a subsequent operation, making it difficult for the user to recognize a current to-be-operated image from many images displayed in the first manner.

In some embodiments, a time period may be set for the label of the first image on which the first input is performed. After the time period of the label is exceeded, the label is disassociated from the first image, or the label is deleted. In this way, after the time period is exceeded, the first image is no longer displayed in a display manner corresponding to the label. In an exemplary implementation, the length of the time period may be set according to a type of the label. For example, the time period of the invoking label may be one day or one week, and the time period of the editing label may be one month.

In addition, in actual application, the same image may be associated with a plurality of labels, that is, the target resource positioning information may be associated with a plurality of labels. Therefore, the label associated with the target resource positioning information exceeding the time period may be understood as: the plurality of labels associated with the target resource positioning information all exceeding the time period. In this case, the image corresponding to the target resource positioning information has no associated label, so the target resource positioning information is deleted, thereby avoiding resource occupation of the target resource positioning information.

It should be noted that, after the target resource positioning information is deleted, if the first input for the image corresponding to the target resource positioning information is received again, a label associated with the target resource positioning information is generated again, and the process of the image display method provided in this embodiment of the present disclosure is repeated.

The image display method provided in the embodiments of the present disclosure includes: receiving a second input from a user in a case that a first input for a first image is received; and displaying a first display interface in response to the second input, where the first display interface includes the first image displayed in a first manner and a second image displayed in a second manner, and the first image and the second image are different images in a target gallery. In this way, when the user invokes the target gallery through the second input, the first image and the second image can be displayed in different manners, to avoid confusion between the first image and the second image, thereby improving recognition of images in the target gallery.

Figure 2:
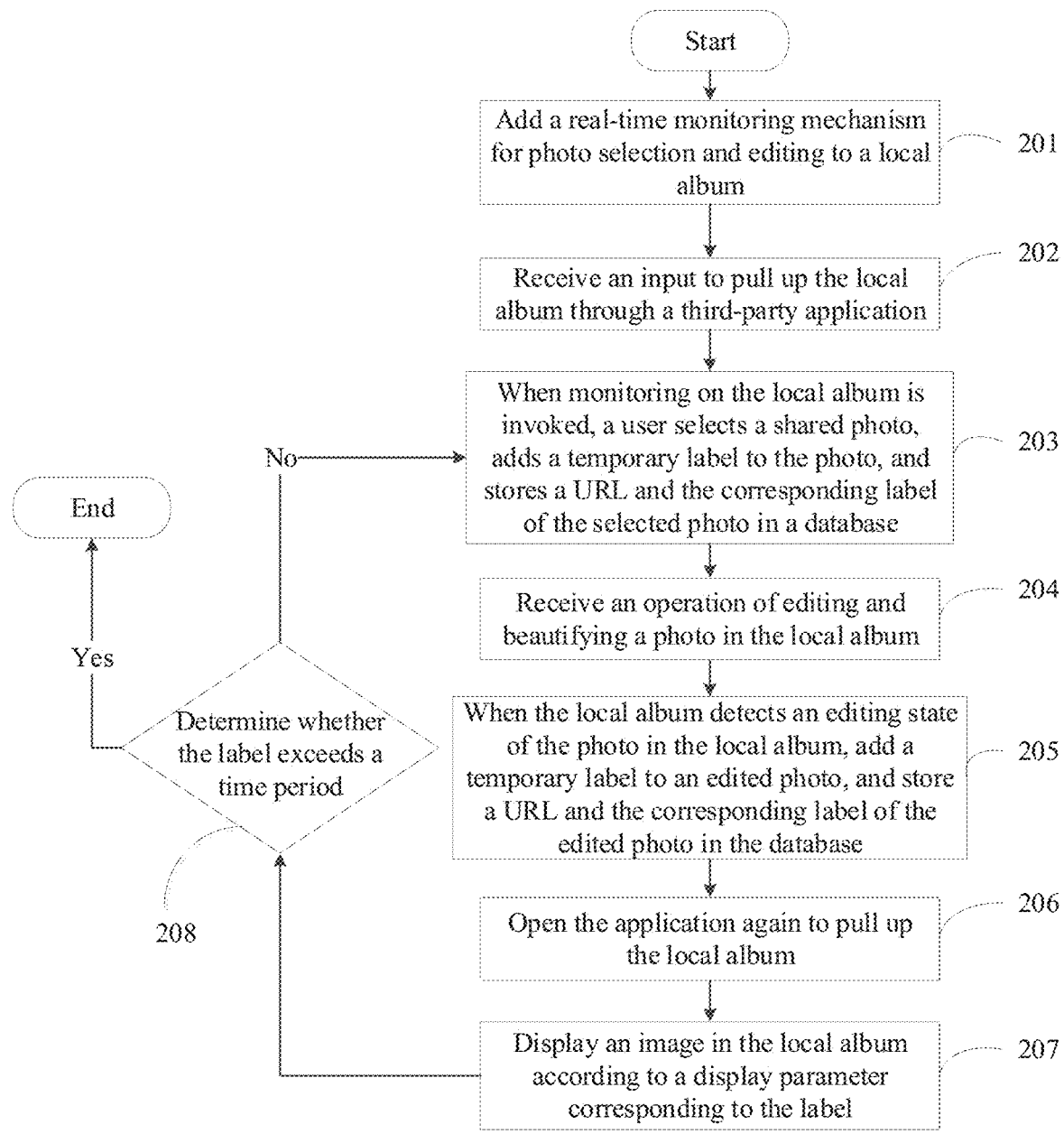
FIG. 2 is a flowchart of another image display method according to an embodiment of the present disclosure.

As shown in FIG. 2, the following uses an example in which the image display method provided in the embodiments of the present disclosure is applied to a local album on an electronic device to describe a working procedure of the image display method.

Step 201: Add a real-time monitoring mechanism for photo selection and editing to a local album.

In this step, the photo selection may also be referred to as photo invoking, and in the implemented monitoring mechanism, an invoking input and an editing input for any photo in the album may be obtained.

Step 202: Receiving an input to pull up the local album through a third-party application.

In this step, the third-party application may be any application that can transmit, share, upload, or edit an image, and the pull up of the local album may be understood as: pulling up the local album to invoke or edit a photo in the local album.

Step 203: When monitoring on the local album is invoked, a user selects a shared photo, adds a temporary label to the photo, and stores a URL and the corresponding label of the selected photo in a database.

Figure 3:
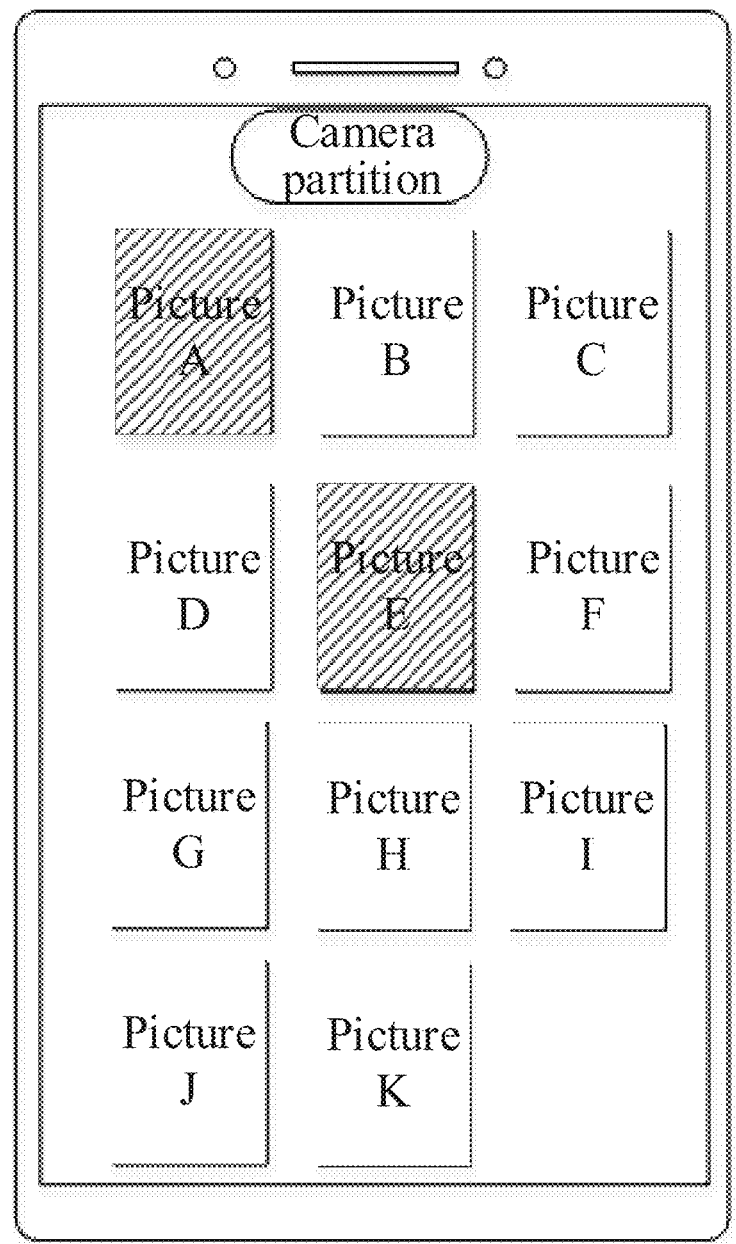
FIG. 3 is a first application scenario diagram of an image display method according to an embodiment of the present disclosure.

In application scenario 1, step 203 may be as follows: The user opens a social application and selects photo sharing to pull up the local album. The temporary label added to the photo is an invoking label, and a display parameter corresponding to the invoking label is a background gray display. For example, as shown in FIG. 3, after opening the social application to select picture A and picture E for sharing, the user adds the invoking label to picture A and the picture E, and when opening the social application again to select a photo within a time period of the invoking label, the user displays the picture A and the picture E according to the display parameter of the background gray.

Step 204: Receive an operation of editing and beautifying a photo in the local album.

Step 205: When the local album detects an editing state of the photo in the local album, add a temporary label to an edited photo, and store a URL and the corresponding label of the edited photo in the database.

In this step, the temporary label added to the edited photo may be different from the temporary label in step 203.

Figure 4:
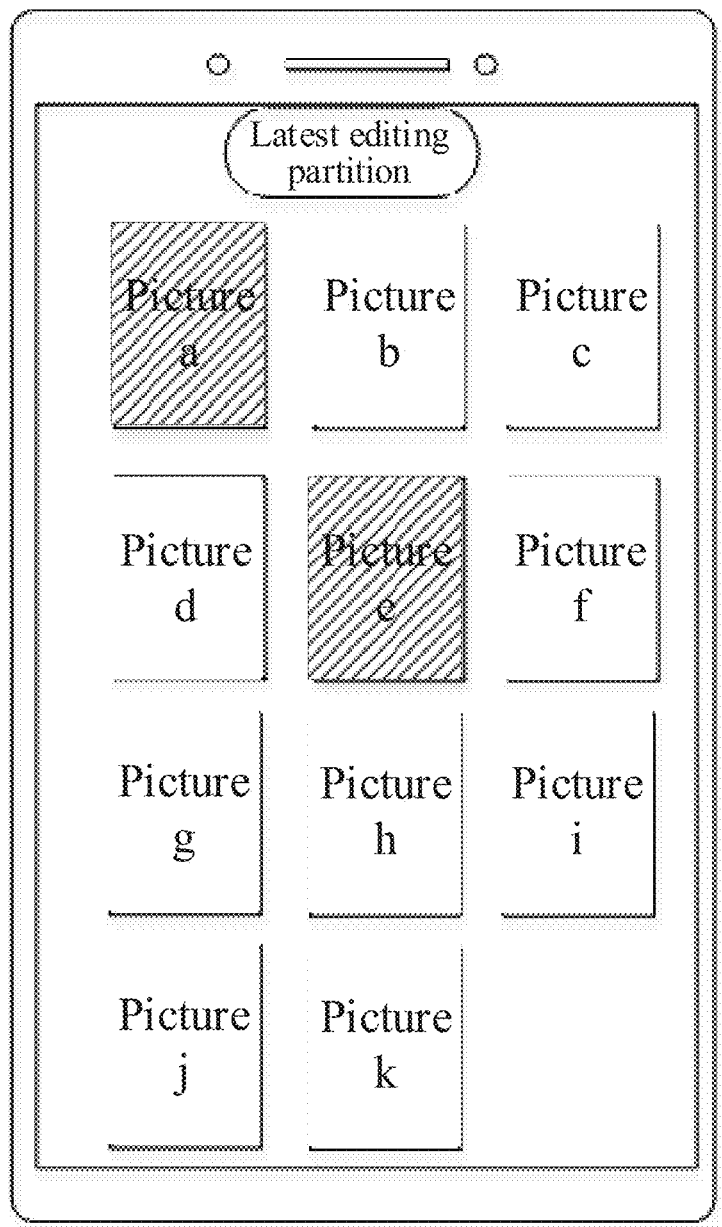
FIG. 4 is a second application scenario diagram of an image display method according to an embodiment of the present disclosure.

In application scenario 2, step 205 may be: the user edits the photo to generate the edited picture. The temporary label added to the edited picture is an editing label, and a display parameter corresponding to the editing label is the latest editing partition. For example, as shown in FIG. 4, after editing a photo, the user generates an edited picture a and an edited picture e, adds an editing label to the picture a and the picture e, and when selecting a photo in the local album within a time period of the editing label, the user displays the picture a and the picture e in a sub-gallery corresponding to the latest editing partition. In addition, in a scenario shown in FIG. 4, after opening the social application to select a picture a and a picture e for sharing, the user adds an invoking label to the picture a and the picture e, and when opening the social application again to select a picture within a time period of the invoking label, the user displays the picture a and the picture e according to a display parameter with brightness increasing.

Step 206: Open the application again to pull up the local album.

In this step, the application may be the same as the application in step 202.

Step 207: Display an image in the local album according to a display parameter corresponding to the label.

In this step, when the local album detects that the album is pulled up, a URL of a photo associated with the invoking label corresponding to a package name is selected from the database according to the application package name of the application for pulling up the album, and a layer of grey shade is added to these photos. Similarly, a URL of a photo associated with the editing label is selected from the database, and a temporary latest editing partition is added to these photos. The user may directly select an edited photo by viewing the latest editing partition and determine, according to a state of transparency graying, whether the photo is previously selected. An exemplary effect is shown in FIG. 3 and FIG. 4.

In an exemplary implementation, after step 207, all photos displayed in the local album are restored to their original state, that is, the local album is displayed according to a case that the temporary latest editing partition is not set and a display parameter of the temporary latest editing partition.

Step 208: Determine whether the label exceeds a time period.

In a case that the determining result of step 208 is "yes", the procedure ends, and in a case that the determining result of step 208 is "no", steps 204 to 207 are cyclically performed.

It should be noted that, in an exemplary implementation, label adding is a continuous process, and the same photo may be associated with a plurality of labels. Whether the label exceeds the time period may be understood as: whether the plurality of labels associated with the same photo exceeds the time period. If a determining result is "yes", the URL of the photo is deleted, so that in a subsequent operation process, the photo corresponding to the display label is not distinguished from another photo.

In addition, generally, the user intensively sends photos. After the user shares photos in a time period, URLs and temporary labels of the photos stored in the database are deleted gradually with time. In this implementation, a temporary label is added, storage information does not explode in the database, and the user is not affected by a previous operation the next time of sharing, thereby improving the practicality of the image display method.

Figure 5:
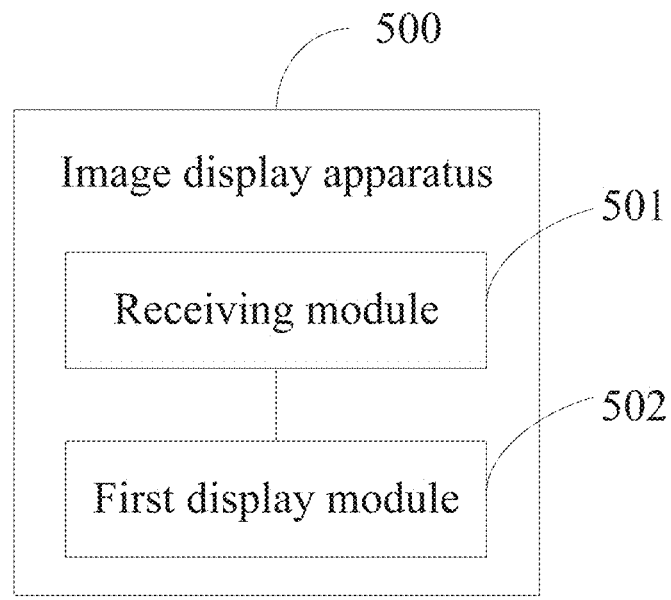
FIG. 5 is a first structural diagram of an image display apparatus according to an embodiment of the present disclosure.

Referring to FIG. 5, FIG. 5 is a structural diagram of an image display apparatus according to an embodiment of the present disclosure. As shown in FIG. 5, an image display apparatus 500 may include the following modules:

a receiving module 501, configured to receive a second input from a user in a case that a first input for a first image is received; and a first display module 502, configured to display a first display interface in response to the second input, where the first display interface includes the first image displayed in a first manner and a second image displayed in a second manner, and the first image and the second image are different images in a target gallery.

In some embodiments, the first input includes at least one of the following:

an invoking input for the first image by using a target application; or an editing input for the first image, where in a case that the first input includes the editing input for the first image, the electronic device further includes:

a response module, configured to generate an edited first image in response to the editing input, where the first display interface displayed by the first display module includes the edited first image displayed in the first manner.

In some embodiments, at least one of the following features in first manner and second manner is different, including background color, transparency, display brightness, or a display area.

In some embodiments, the receiving module 501 is configured to:

receive the second input from the user in a case that the first input for the first image and a third input for a third image are received, where the first display interface displayed by the first display module 502 includes the first image displayed in the first manner, the second image displayed in the second manner, and the third image displayed in a third manner, and the first image, the second image, and the third image are different images in the target gallery.

In some embodiments, the receiving module 501 is configured to:

receive the second input from the user at a second moment in a case that the first input for the first image is received at a first moment.

The first display module 502 is configured to:

if a time interval between the first moment and the second moment is less than or equal to a first threshold, display the first image in the first manner and display the second image in the second manner on the first display interface in response to the second input.

Figure 6:
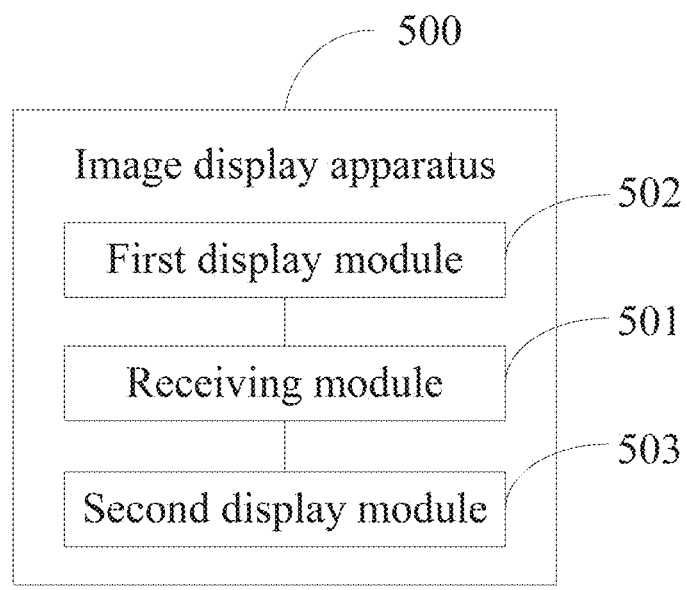
FIG. 6 is a second structural diagram of an image display apparatus according to an embodiment of the present disclosure.

As shown in FIG. 6, the image display apparatus 500 further includes:

a second display module 503, configured to: if the time interval between the first moment and the second moment is greater than the first threshold, display the first image and the second image in the second display manner on the first display interface in response to the second input.

The image display apparatus provided in this embodiment of the present disclosure can implement the processes in the method embodiment shown in FIG. 1. To avoid repetition, details are not described herein again.

Figure 7:
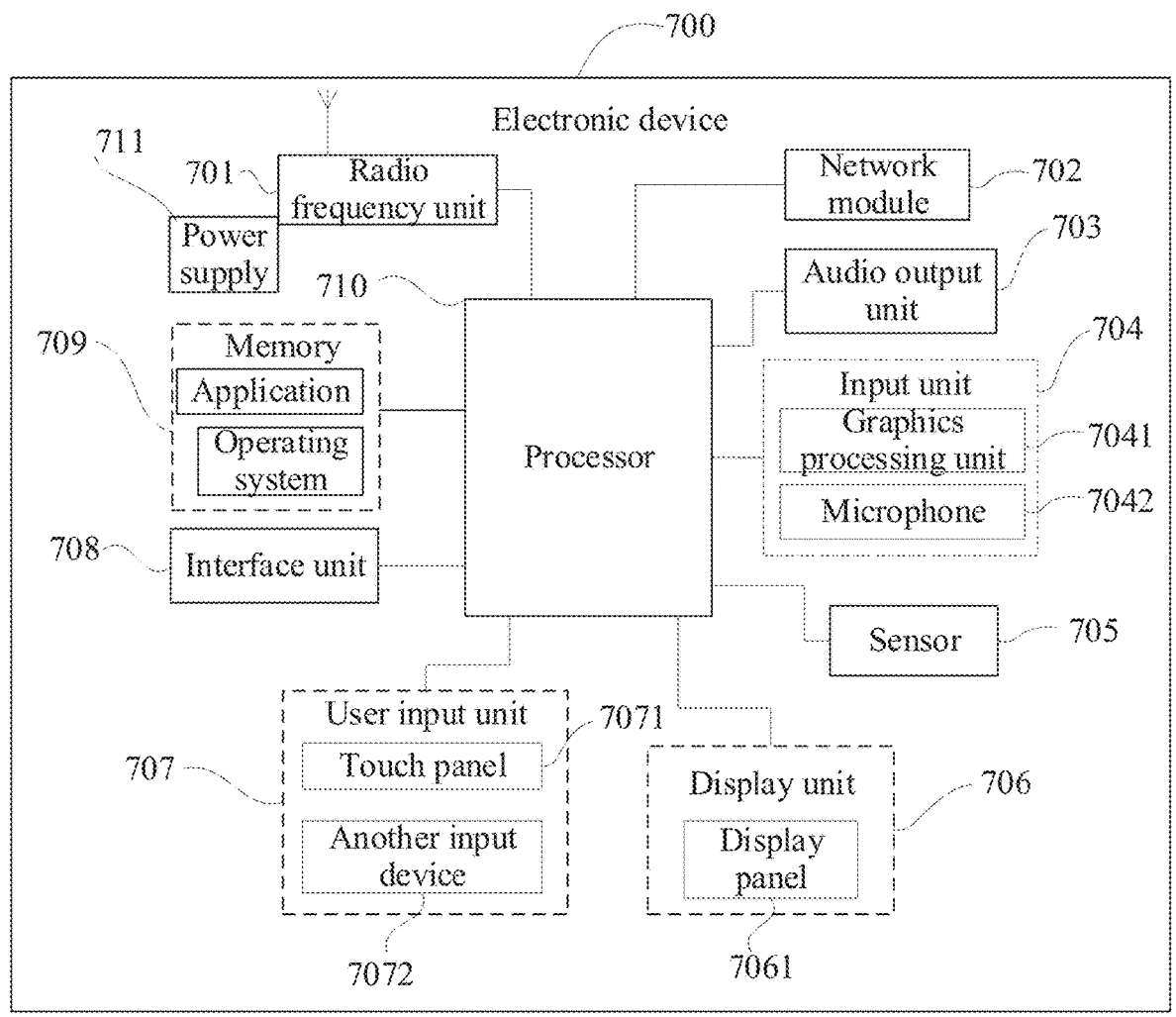
FIG. 7 is a structural diagram of an electronic device according to an embodiment of the present disclosure.

Referring to FIG. 7, FIG. 7 is a schematic structural diagram of the hardware of an electronic device according to the embodiments of the present disclosure.

An electronic device 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand the structure of the electronic device shown in FIG. 7 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle mobile terminal, a wearable device, a pedometer, a computer, and the like.

The user input unit 707 is configured to receive a first input for a first image.

The user input unit 707 is further configured to receive a second input from a user in a case that the first input for the first image is received.

The display unit 706 is configured to display a first display interface in response to the second input, where the first display interface includes the first image displayed in a first manner and a second image displayed in a second manner, and the first image and the second image are different images in a target gallery.

In some embodiments, the first input includes at least one of the following:

an invoking input for the first image by using a target application; or an editing input for the first image, where in a case that the first input includes the editing input for the first image, the method further includes:

generating an edited first image in response to the editing input, where the first display interface includes the edited first image displayed in the first manner.

In some embodiments, at least one of the following features in first manner and second manner is different, including background color, transparency, display brightness, or a display area.

In some embodiments, that the user input unit 707 receives the second input from the user in a case that the first input for the first image is received includes:

receiving the second input from the user in a case that the first input for the first image and a third input for a third image are received, where the first display interface includes the first image displayed in the first manner, the second image displayed in the second manner, and the third image displayed in a third manner, and the first image, the second image, and the third image are different images in the target gallery.

In some embodiments, that the user input unit 707 receives the second input from the user in a case that the first input for the first image is received includes:

receiving the second input from the user at a second moment in a case that the first input for the first image is received at a first moment;

that the display unit 706 displays the first display interface in response to the second input includes:

if a time interval between the first moment and the second moment is less than or equal to a first threshold, displaying the first image in the first manner and displaying the second image in the second manner on the first display interface in response to the second input; and the display unit 706 is further configured to:

if the time interval between the first moment and the second moment is greater than the first threshold, display the first image and the second image in the second display manner on the first display interface in response to the second input.

The electronic device 700 provided in this embodiment of the present disclosure can display a first image and a second image in different manners in a case that a first input for the first image is received and a second input from a user is received, so that the first image and the second image are distinguished by the user. The electronic device has the same effect as the image display method provided in the embodiments of the present disclosure, and details are not described herein again.

It should be understood that in this embodiment of the present disclosure, the radio frequency unit 701 may be configured to receive and send information or a signal in a call process. In some embodiments, after receiving downlink data from a base station, the radio frequency unit 701 sends the downlink data to processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device through a wireless communication system.

The electronic device provides wireless broadband Internet access for the user by using the network module 702, for example, helping the user to send and receive an e-mail, browse a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the electronic device 700. The audio output unit 703 includes a speaker, a buzzer, a telephone receiver, and the like.

The input unit 704 is configured to receive an audio signal or a video signal. The input unit 704 may include a Graphics Processing Unit (GPU) 7041 and a microphone 7042, and the graphics processing unit 7041 processes image data of a still picture or video obtained by an image capture apparatus (such as a camera) in a video capture mode or an image capture mode. A processed image frame may be displayed on display unit 706. The image frame processed by the graphics processor 7041 may be stored in memory 709 (or another storage medium) or sent by using the radio frequency unit 701 or the network module 702. The microphone 7042 may receive a sound and can process such sound into audio data. Processed audio data may be converted, in a call mode, into a format that can be sent to a mobile communication base station by using the radio frequency unit 701 for output.

The electronic device 700 further includes at least one sensor 705 such as a light sensor, a motion sensor, and another sensor. In some embodiments, the light sensor includes an ambient light sensor and a proximity sensor. The ambient light sensor may adjust the luminance of the display panel 7061 based on the brightness of ambient light. The proximity sensor may turn off the display panel 7061 and/or backlight when the electronic device 700 moves to an ear. As a type of motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include a display panel 7061. The display panel 7061 may be configured in a form of a Liquid Crystal Display (LCD), an Organic Light-Emitting Diode (OLED), or the like.

The user input unit 707 may be configured to: receive entered digital or character information, and generate key signal input related to a user setting and function control of the electronic device. In some embodiments, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to processor 710, and can receive and execute a command sent by processor 710. In addition, the touch panel 7071 may be of a resistive type, a capacitive type, an infrared type, a surface acoustic wave type, or the like. The user input unit 707 may include another input device 7072 in addition to the touch panel 7071. In some embodiments, the other input device 7072 may include but is not limited to a physical keyboard, a functional button (such as a volume control button or a power on/off button), a trackball, a mouse, and a joystick. Details are not described herein.

Further, the touch panel 7071 may cover the display panel 7061. When detecting the touch operation on or near the touch panel 7071, the touch panel 7071 transmits the touch operation to the processor 710 to determine a type of touch event, and then the processor 710 provides the corresponding visual output on the display panel 7061 based on the type of the touch event. In FIG. 7, although the touch panel 7071 and the display panel 7061 are used as two independent parts to implement input and input functions of the terminal device or the electronic device, in some embodiments, the touch panel 7071 and the display panel 7061 may be integrated to implement the input and output functions of the terminal device or the electronic device. This is not specifically limited herein.

The interface unit 708 is an interface for connecting an external apparatus with the electronic device 700. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 708 may be configured to receive input (for example, data information and power) from an external apparatus and transmit the received input to one or more elements in the electronic device 700 or may be configured to transmit data between the electronic device 700 and an external apparatus.

Memory 709 may be configured to store a software program and various data. The memory 709 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 709 may include a high-speed random access memory, and may further include nonvolatile memory, for example, at least one magnetic disk storage device, a flash storage device, or another volatile solid-state storage device.

The processor 710 is a control center of the electronic device, connects all parts of the entire electronic device by using various interfaces and lines, and performs various functions of the electronic device and data processing by running or executing a software program and/or a module that are/is stored in the memory 709 and by invoking data stored in the memory 709, to overall monitor the electronic device. The processor 710 may include one or more processing units. In some embodiments, an application processor and a modem processor may be integrated into processor 710. The application processor mainly processes an operating system, a user interface, an application, and the like. The modem processor mainly processes wireless communications. It can be understood that, the modem processor may not be integrated into processor 710.

The electronic device 700 may further include the power supply 710 (such as a battery) that supplies power to each component. In some embodiments, the power supply 710 may be logically connected to the processor 710 by using a power supply management system, to implement functions such as charging management, discharging management, and power consumption management by using the power supply management system.

In addition, the electronic device 700 includes some function modules not shown, and details are not described herein.

An embodiment of the present disclosure further provides an electronic device, including a processor 710, a memory 709, and a program or an instruction that is stored in the memory 709 and that can be run on the processor 710. When the program or the instruction is executed by processor 710, the processes of the foregoing image display method embodiment are implemented, and the same technical effect can be achieved. To avoid repetition, details are not described herein again.

In an exemplary embodiment, the electronic device provided in this embodiment of the present disclosure may be an electronic device such as a mobile phone, a tablet personal computer, a laptop computer, a personal digital assistant (PDA), a Mobile Internet Device (MID), a wearable device, a computer, or a notebook computer.

It can be understood that the embodiments described in the present disclosure may be implemented by hardware, software, firmware, middleware, microcode, or a combination thereof. For hardware implementation, a module, a unit, a submodule, a subunit, or the like may be implemented in one or more Application Specific Integrated Circuits (ASIC), Digital Signal Processing (DSP), DSP Device (DSPD), Programmable Logic Device (PLD), Field-Programmable Gate Array (FPGA), general purpose processors, controllers, microcontrollers, microprocessors, or other electronic units or a combination thereof used to perform the functions in this application.

It should be noted that, in this specification, the terms "include", "comprise", or any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above exemplary implementations, and the above exemplary implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An image display method, comprising:
creating a first label associated with a first image in a target gallery, wherein the first label corresponds to a first manner of displaying an image; and
in response to an input to access the target gallery, displaying a first display interface that displays the first image in the first manner and a second image from the target gallery in a second manner, wherein the first image is different from the second image and the first manner is different from the second manner.

2. The image display method according to claim 1, wherein the first label is created in response to a first input, and the first input comprises at least one of the following:
an invoking input for the first image by using a target application; or
an editing input for the first image.

3. The image display method according to claim 2, wherein when the first input comprises the editing input for the first image, the image display method further comprises:
generating an edited first image in response to the editing input,
wherein the first display interface displays the edited first image first.

4. The image display method according to claim 1, wherein the first manner and the second manner are different in at least one of background color, transparency, display brightness, or display area.

5. The image display method according to claim 1, wherein the first label is created in response to a first input received at a first moment, wherein the input to access the target gallery is a second input received at a second moment after the first moment,
wherein before displaying the first display interface that displays the first image in the first manner and the second image from the target gallery in the second manner the image display method further comprises:
determining that a time interval between the first moment and the second moment is less than or equal to a first threshold.

6. The image display method according to claim 1, further comprising:
receiving a third input for a third image before receiving the input to access the target gallery; and
displaying the third image on the first display interface,
wherein the first image, the second image, and the third image are different images in the target gallery.

7. The image display method according to claim 6, wherein the third input is received at a third moment, wherein the input to access the target gallery is a second input received at a second moment after the third moment,
wherein the image display method further comprises:
when a time interval between the third moment and the second moment is greater than a first threshold, displaying the third image and the second image in the second manner on the first display interface in response to the second input.

8. An electronic device, comprising:
a memory storing a computer program; and
a processor coupled to the memory and configured to execute the computer program to perform operations comprising:
creating a first label associated with a first image in a target gallery, wherein the first label corresponds to a first manner of displaying an image; and
in response to an input to access the target gallery, displaying a first display interface that displays the first image in the first manner and a second image from the target gallery in a second manner, wherein the first image is different from the second image and the first manner is different from the second manner.

9. The electronic device according to claim 8, wherein the first label is created in response to a first input, and the first input comprises at least one of the following:
an invoking input for the first image by using a target application; or
an editing input for the first image.

10. The electronic device according to claim 9, wherein when the first input comprises the editing input for the first image, the operations further comprise:
generating an edited first image in response to the editing input,
wherein the first display interface displays the edited first image first.

11. The electronic device according to claim 8, wherein the first manner and the second manner are different in at least one of background color, transparency, display brightness, or display area.

12. The electronic device according to claim 8, wherein the first label is created in response to a first input received at a first moment, wherein the input to access the target gallery is a second input received at a second moment after the first moment,
wherein before displaying the first display interface that displays the first image in the first manner and the second image from the target gallery in the second manner, the operations further comprise:
determining that a time interval between the first moment and the second moment is less than or equal to a first threshold.

13. The electronic device according to claim 8, wherein the operations further comprise:
receiving a third input for a third image before receiving the input to access the target gallery; and
displaying the third image on the first display interface,
wherein the first image, the second image, and the third image are different images in the target gallery.

14. The electronic device according to claim 13, wherein the third input is received at a third moment, wherein the input to access the target gallery is a second input received at a second moment after the third moment,
wherein the operations further comprise:
when a time interval between the third moment and the second moment is greater than a first threshold, displaying the third image and the second image in the second manner on the first display interface in response to the second input.

15. A non-transitory computer-readable storage medium, storing a computer program, wherein the computer program, when executed by a processor, causes the processor to perform operations comprising:
creating a first label associated with a first image in a target gallery, wherein the first label corresponds to a first manner of displaying an image; and
in response to an input to access the target gallery, displaying a first display interface that displays the first image in the first manner and a second image from the target gallery in a second manner, wherein the first image is different from the second image and the first manner is different from the second manner.

16. The non-transitory computer-readable storage medium according to claim 15, wherein the first label is created in response to a first input, and the first input comprises at least one of the following:

an invoking input for the first image by using a target application; or an editing input for the first image.

17. The non-transitory computer-readable storage medium according to claim 16, wherein when the first input comprises the editing input for the first image, the operations further comprise:

generating an edited first image in response to the editing input, wherein the first display interface displays the edited first image first.

18. The non-transitory computer-readable storage medium according to claim 17, wherein the first manner and the second manner are different in at least one of background color, transparency, display brightness, or display area.

19. The non-transitory computer-readable storage medium according to claim 15, wherein the first label is created in response to a first input received at a first moment, wherein the input to access the target gallery is a second input received at a second moment after the first moment, wherein before displaying the first display interface that displays the first image in the first manner and the second image from the target gallery in the second manner, the operations further comprise:

determining that a time interval between the first moment and the second moment is less than or equal to a first threshold.

20. The non-transitory computer-readable storage medium according to claim 15, wherein the operations further comprise:

receiving a third input for a third image before receiving the input to access the target gallery; and displaying the third image on the first display interface, wherein the first image, the second image, and the third image are different images in the target gallery.

* * * * *